Figure 1:
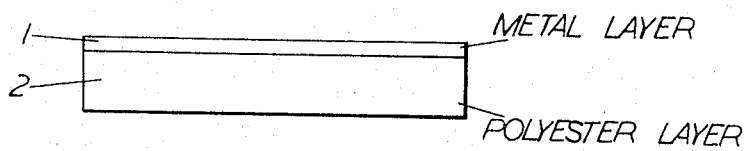

March 7, 1967 P. ROUAULT 3,308,004
TRANSLUCENT PANELS HAVING SELECTIVE TRANSMISSION
AND THEIR MANUFACTURE
Filed March 13, 1961

1 — METAL LAYER
2 — POLYESTER LAYER

1 — METAL LAYER
3 — SUPPORTING FILM LAYER
2 — POLYESTER LAYER

3 — SUPPORTING FILM LAYER
1 — METAL LAYER
2 — POLYESTER LAYER

Inventor
Paul Rouault
By
Stevens, Davis, Miller & Mosher
Attorneys 3,308,004
TRANSLUCENT PANELS HAVING SELECTIVE
TRANSMISSION AND THEIR MANUFACTURE
Paul Rouault, Colombes, Siene, France, assignor to Societe
des Usines Chimiques Rhone-Poulenc, Paris, France,
a French body corporate
Filed Mar. 13, 1961, Ser. No. 95,048
Claims priority, application France, Mar. 12, 1960,
821,677
5 Claims. (Cl. 161—1)

The present invention relates to new translucent panels having selective light transmission, and more especially to panels which arrest a substantial amount of infra-red radiation.

Increasing use is being made of plane or corrugated panels consisting of polyester resins reinforced by glass fibres as roofing materials in buildings. They have the advantage over metal panels that they are translucent and permit illumination of the premises by sunlight. However, such panels transmit simultaneously with visible rays a high proportion of infra-red rays, and therefore of heat, thus producing a glass house effect.

It has been proposed to overcome this disadvantage by disposing between two layers of reinforced polyester resin aluminium sheets formed with a number of perforations. The transmission of visible light and of infra-red rays is proportional to the surface remaining between these perforations, but the ratio between infra-red rays and visible rays passing through the panel remains the same.

It is also known that very thin metal layers obtained, for example, by metallization in vacuo and of thickness of the order of hundredths of a micron transmit a very large proportion of certain radiation, but substantially arrest certain other radiation. By appropriately choosing the nature and the thickness of the deposit, it is possible to produce surfaces which allow the greater part of the visible light to pass, but arrest a very large proportion of the infra-red radiation. This method has been employed in the manufacture of filters, but metallization in vacuo of large rigid surfaces is technically very complicated and time-consuming and severely limited as to dimensions by the existing apparatus.

It has now been found that it is possible to produce coated panels of reinforced polyester resins by polymerizing the unsaturated ester starting material in contact with a film of a material which has previously been coated with a very thin metal layer, and by this means to prepare translucent metallized panels which transmit a large proportion of visible light, about 30% to 50% of that of unmetallized panels of the same thickness, but arrest from 75% to 95% of infra-red radiation.

The polyesters employed in making the polyester resins can be the unsaturated polyesters currently employed in the manufacture of panels, that is to say, esters of unsaturated dibasic acids such for instance as maleic acid and fumaric acid, and, if desired, of saturated dibasic acids such as phthalic acid, with di- and polyalcohols. They are copolymerized with the conventional monomers, e.g. styrene, allyl phthalate, or vinyl acetate. As fillers, glass fibers, etc. are incorporated. The polymerization is carried out with the usual catalysts, in the cold or at elevated temperatures below those at which the material of the metallized film would undergo degradation.

For the films, any film-forming material may be employed which is not attacked by the materials to be polymerized, for example regenerated cellulose and cellulose derivatives such as cellulose esters, e.g. cellulose acetate, cellulose acetobutyrate, nitrocellulose; vinyl derivatives, such as vinyl chloride-acetate copolymers; stretched polystyrene; or polyethylene terephthalate.

The metallization of the film is preferably effected by the deposition of metal vapours under a high vacuum, whereby it is possible to obtain very thin uniform layers of metals. The metal employed may be aluminium or copper or their alloys, or a noble metal. A layer corresponding to a deposit of the order of 0.01 g. of metal, or even less, per square metre is suitable in the case of aluminium.

The formation of the polyester resin may be effected in contact with the metallized face of the film or with the opposite face. In the former case the metal coating is enclosed, after the polymerization, between the polyester resin and the film, which performs the function of a protecting agent for the metal layer. It is also possible to transfer the metal layer on to the polyester resin by choosing as the material for the film a material to which the metal does not adhere firmly, or by covering the film before metallization with an anti-adhesive material such as, for example, beeswax. When the polymerization of the polyester is complete, the film freed from its metal layer is detached and panels covered only with the metal coating are obtained. This coating may remain bare or it may be covered by a protective varnish. This procedure may be desirable if it is required that the protective varnish shall have properties not possessed by the initial supporting film, such as greater hardness or resistance to weathering.

If the polymerization is effected on the unmetallized surface, it is necessary to choose such a material for the film that good adhesion is obtained between the polyester resin and the film, or previously to cover the unmetallized portion of the film with a layer of a material which adheres well both to the polyester resin and the film. For example, a cellulose acetate film adheres badly to the usual polyester resins but adhesion can be improved by coating the film with a varnish based on a vinyl copolymer or acrylic resin. Since the metal coating is situated on the outside in this case, it may be desirable to coat it with a protective varnish.

The following example illustrates the invention. Parts and percentages are by weight.

*Example*

Onto a polyethylene terephthalate film 0.1 mm. thick and measuring 2 x 1 m., which has been coated by metallization in vacuo with an aluminium layer (0.01 g. of metal per square metre of surface of the film) is deposited a thin layer of glass fibres (weight 450 g./m.$^2$). Onto this layer is poured a solution of 65 parts of unsaturated polyester in 35 parts of styrene, to which has been added 1% of methyl ethyl ketone peroxide in solution in dimethyl phthalate and 0.2% of cobalt 2-ethyl-hexanoate. The viscosity of the solution is 6 poises at 25° C., and there is deposited on the layer of glass fibres a weight of solution corresponding to 1 kg./m.$^2$. The solution is caused to penetrate into the mat of glass fibres with the aid of a scraper in order to expel the air, whereafter it is covered with a sheet of regenerated cellulose to prevent evaporation of the styrene, and allowed to harden at room temperature for 1 hour, the treatment being terminated by heating in an oven for about 4 hours at 70° C. The cellulose sheet is thereafter removed. The translucent panel obtained stops about 80% of the infra-red light radiation.

By repeating the same operations, but on a film of polyethylene terephthalate which has been covered before metallization with an anti-adhesive such as, for example, beeswax, a polyester resin panel is obtained in which the face consisting of the polyethylene terephthalate film can be readily detached so as to expose the metal layer adhering strongly to the polyester resin. If desired, this layer may be coated with a varnish to protect it against weathering.

The unsaturated polyester employed in this example was obtained by polycondensation in the known way of 1 mole of maleic acid, 1 mole of phthalic anhydride and 2 moles of propylene glycol.

Figure 2:
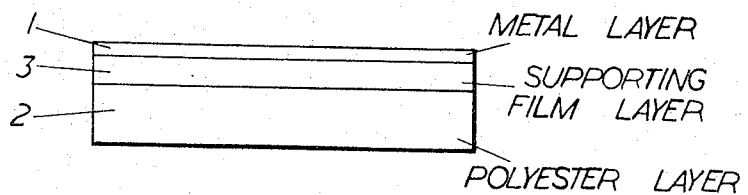
Figure 3:
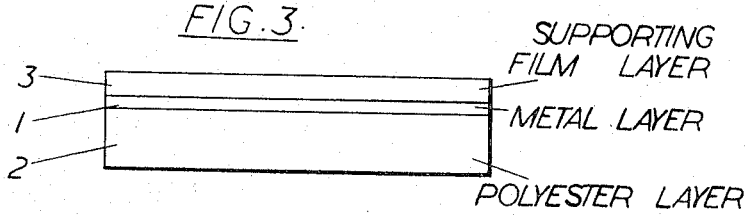

Forms of assembly of the products of the present invention are illustrated in the accompanying drawings, wherein FIGURES 1, 2 and 3 illustrate alternative forms.

FIGURE 1 illustrates the case where the panel consists of a polyester layer 2, which may be reinforced or not, carrying a metal layer 1 as described herein. This product can be obtained by the variant of the method of the foregoing example wherein the polyester film has been stripped away.

FIGURE 2 illustrates the case where the panel consists of a polyester layer 2, which may be reinforced or not, carrying a film supporting layer 3 which, in turn, carries the metal layer 1 as described herein.

FIGURE 3 illustrates the case where the panel consists of a polyester layer 2, which may be reinforced or not, carrying a metal layer 1 as described herein and a film supporting layer 3 on the other side of the metal layer 1. This product is that described in the foregoing specific example.

I claim:

1. Translucent reinforced building panels consisting of a sheet of cross-linked unsaturated polyester resin containing glass fibres and carrying on one face a contiguous continuous metallic layer of thickness such as to arrest a substantial proportion of infra-red radiation striking said layer but transmitting a substantial proportion of visible light striking said layer.

2. Translucent rigid panels according to claim 1 carrying a layer of aluminium weighing about 0.01 gram per square metre.

3. Process for the production of a translucent reinforced panel having a selective radiation transmission which comprises applying an unsaturated polyester resin containing glass fibers to a metallic layer having a thickness such as to arrest a substantial proportion of infra-red radiation striking said layer while transmitting a substantial proportion of visible light striking said layer, and cross-linking said resin whereby it is hardened and bonded to said metallic layer.

4. Process according to claim 3 in which the metallic layer is a layer of aluminium weighing about 0.01 gram per square metre.

5. The process according to claim 3 wherein the metallic layer is intially carried by a flexible support and stripping said support from the panel after the resin has been hardened.

References Cited by the Examiner

UNITED STATES PATENTS

| | | | |
|---|---|---|---|
| 2,650,213 | 8/1953 | Hofrichter | 161—214 |
| 2,680,695 | 6/1954 | Judd | 117—35 |
| 2,689,802 | 9/1954 | Korver | 117—107 |
| 2,703,772 | 3/1955 | Keithly | 161—217 |
| 2,740,732 | 4/1956 | Peck et al. | |
| 2,758,510 | 8/1956 | Auwarter | 117—33.3 |
| 2,774,421 | 12/1956 | Lion. | |
| 2,883,315 | 4/1959 | Palmquist | 161—232 |
| 2,944,994 | 7/1960 | Singleton et al. | 156—99 |
| 3,086,216 | 4/1963 | Brooks | 161—214 |

FOREIGN PATENTS

| | | |
|---|---|---|
| 1,242,430 | 8/1960 | France. |

EARL M. BERGERT, *Primary Examiner.*

CARL F. KRAFFT, *Examiner.*

W. F. ZAGURSKI, W. J. VAN BALEN, *Assistant Examiners.*